US012544662B2

(12) United States Patent
Zhang

(10) Patent No.: US 12,544,662 B2
(45) Date of Patent: Feb. 10, 2026

(54) METHOD FOR PROCESSING DRESS-UP PROP, AND NON-TRANSITORY COMPUTER-READABLE STORAGE MEDIUM AND ELECTRONIC DEVICE

(71) Applicant: NETEASE (HANGZHOU) NETWORK CO., LTD., Zhejiang (CN)

(72) Inventor: Xuanyi Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 265 days.

(21) Appl. No.: 18/249,068

(22) PCT Filed: Jan. 15, 2021

(86) PCT No.: PCT/CN2021/072228
§ 371 (c)(1),
(2) Date: Apr. 14, 2023

(87) PCT Pub. No.: WO2022/110518
PCT Pub. Date: Jun. 2, 2022

(65) Prior Publication Data

US 2023/0390637 A1 Dec. 7, 2023

(30) Foreign Application Priority Data

Nov. 25, 2020 (CN) ......................... 202011341598.2

(51) Int. Cl.
*A63F 13/52* (2014.01)
*A63F 13/63* (2014.01)
*A63F 13/792* (2014.01)

(52) U.S. Cl.
CPC .............. *A63F 13/52* (2014.09); *A63F 13/63* (2014.09); *A63F 13/792* (2014.09); *A63F 2300/308* (2013.01)

(58) Field of Classification Search
CPC ....................................................... A63F 13/63
See application file for complete search history.

(56) References Cited

U.S. PATENT DOCUMENTS 11,380,077 B2 * 7/2022 Scapel .................. A63F 13/213
12,067,214 B2 * 8/2024 Mourkogiannis .... G06K 7/1413
(Continued)

FOREIGN PATENT DOCUMENTS

CN 109603151 A 4/2019
CN 110020881 A 7/2019
(Continued)

OTHER PUBLICATIONS

1st Office Action dated Jun. 20, 2023 of Japanese Office Action No. 2022-548642.
(Continued)

*Primary Examiner* — Jay Trent Liddle
(74) *Attorney, Agent, or Firm* — Qinghong Xu

(57) ABSTRACT

A method for processing a dress-up prop, where a graphical user interface is provided by a first terminal device, content displayed in the graphical user interface includes a game character, and the method includes: popping up, in response to a first selection operation instruction for the game character, an information display interface on the graphical user interface, the information display interface including a display window, the display window displaying a dress-up prop for dressing on the game character, and the information display interface comprising a purchase control; and triggering, in response to an operation instruction for the purchase control, a purchase of the dress-up prop.

18 Claims, 9 Drawing Sheets

AA Time
BB Datang Government
CC Player name
DD Stranger
EE Information
FF Player team name
GG Friend
HH Space
II Giving
JJ Transaction
KK Team-up
LL Attack
MM Chat
OO Temporary
PP Team
QQ Image
RR Achievement
XX Cancel viewing
SS Equipment
TT Purchase
UU Task tracking
VV Sign in the event calendar
WW Current

(56) References Cited

U.S. PATENT DOCUMENTS

| | | | | |
|---|---|---|---|---|
| 2009/0300513 | A1* | 12/2009 | Nims | A63F 13/5258 715/747 |
| 2009/0305756 | A1* | 12/2009 | Blair | A63F 13/30 463/43 |
| 2010/0079467 | A1* | 4/2010 | Boss | A63F 13/30 345/474 |
| 2014/0200084 | A1* | 7/2014 | Butler | A63F 13/00 463/43 |
| 2014/0342808 | A1* | 11/2014 | Chowdhary | A63F 13/493 463/24 |
| 2015/0024852 | A1* | 1/2015 | Pacey | A63F 13/58 463/43 |
| 2016/0166935 | A1* | 6/2016 | Condrey | A63F 13/48 463/31 |
| 2016/0206959 | A1* | 7/2016 | Nelson | A63F 13/35 |
| 2017/0080346 | A1* | 3/2017 | Abbas | A63F 13/79 |
| 2017/0312634 | A1* | 11/2017 | Ledoux | A63F 13/655 |
| 2019/0108578 | A1* | 4/2019 | Spivack | G09B 5/065 |
| 2020/0306640 | A1* | 10/2020 | Kolen | A63F 13/67 |

FOREIGN PATENT DOCUMENTS

| | | | |
|---|---|---|---|
| CN | 110784732 | A | 2/2020 |
| CN | 111084980 | A | 5/2020 |
| CN | 111408130 | A | 7/2020 |
| CN | 111821692 | A | 10/2020 |
| CN | 111841014 | A | 10/2020 |
| JP | 6290505 | B1 | 3/2018 |

OTHER PUBLICATIONS

ICapcomChannel, "Steam version [MHW:I] Armor Defense Corps a series Sensuke video", YouTube video, https://www.youtube.com/watch?v=FzmV5DICpx0&t=ls, Nov. 6, 2019.

Valorant The Way of Buying Valorant's Weapons! How to Buy for Others and How to Get Others to Buy for You. Can be Handed Over Directly Without Dropping The Weapon, https://arutora.com/21746#0, Jun. 16, 2020.

Yi Yang Zhi Zhi Jia, "Fantasy Westward Journey: Buy Yang Yang's Limited-Edition Brocade Dresses from Lao Wang Golden Pig Live Stream, and Get Likes for a Discount)", https://www.bilibili.com/video/BVlja4ylt7kC, Apr. 2, 2020 (Apr. 2, 2020), entire video.

International Search Report dated Aug. 24, 2021 of International Application No. PCT/CN2021/072228.

Ist Office Action dated Aug. 11, 2021 of Chinese Application No. 202011341598.2.

Xi Men Zhui Ming, "How to play with Fantasy Westward Journey equipment switching system?", Nov. 19, 2010 (Nov. 19, 2010).

Notice of Allowance dated Jun. 4, 2024 of Japanese Application No. 2022-548642.

* cited by examiner

AA Time
BB City Jianye
CC Yangyang
DD Fantasy Westward Journey II
EE Stranger
FF Giving
GG Transaction
HH Team-up
II Team
JJ Friend
KK Temporary
LL Observation
MM Chat
NN Space
OO Achievement
PP Information
QQ Strange mission
RR Theatre pedlar
SS Fantasy Westward Journey
TT Current
UU Attack AA Observation
BB Dress
CC Mascot
DD Decoration
EE Equipment
FF Skill
GG Player nickname
HH Luyangqu Tongliya
II ID number
JJ Level AA Time
BB Datang Government
CC Player name
DD Stranger
EE Information
FF Player team name
GG Friend
HH Space
II Giving
JJ Transaction
KK Team-up
LL Attack
MM Chat
NN Temporary
OO Team
PP Image
QQ Achievement
RR Observation
SS Equipment
TT Purchase
UU Task tracking
VV Sign in the event calendar
WW Current

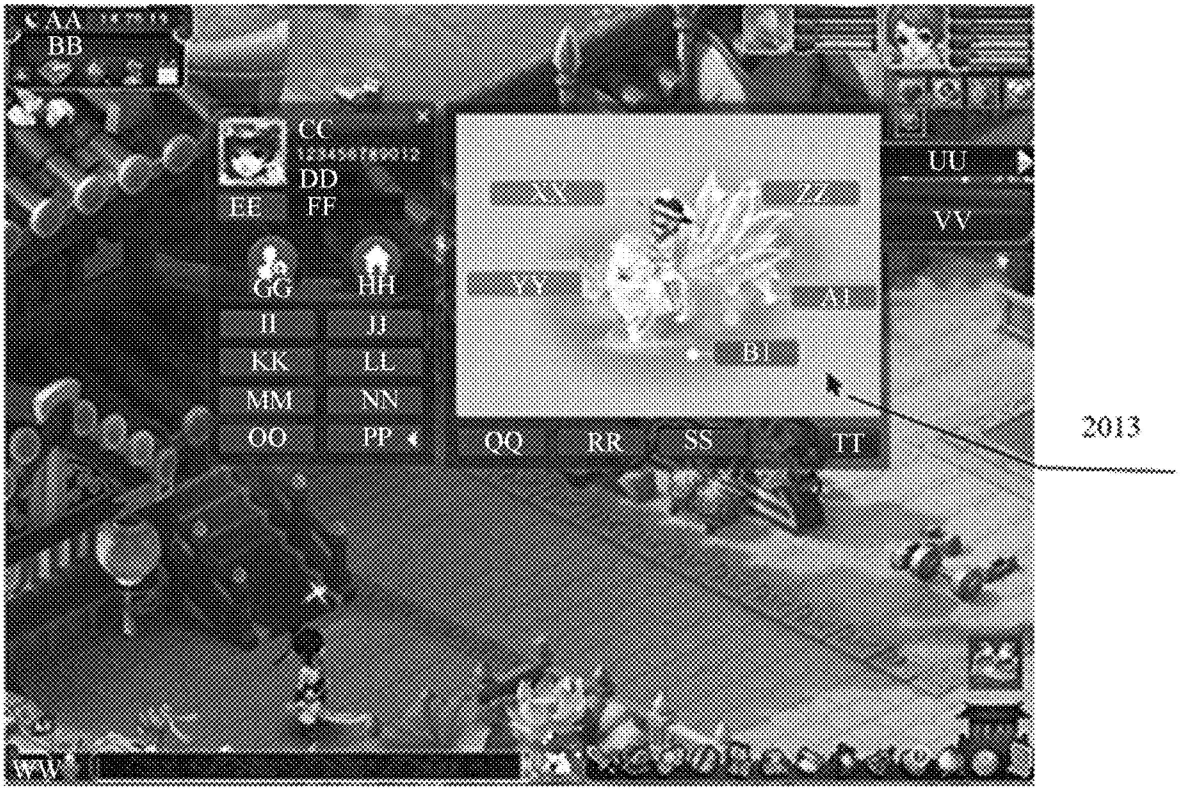

AA Time
BB Datang Government
CC Player name
DD Stranger
EE Information
FF Player team name
GG Friend
HH Space
II Giving
JJ Transaction
KK Team-up
LL Attack
MM Chat
NN Temporary
OO Team
PP Image
QQ Achievement
RR Observation
SS Equipment
TT Purchase
UU Task tracking
VV Sign in the event calendar
WW Current
XX Blue-and-white porcelain Black
YY Blue-and-white porcelain White
ZZ Nine tailed Ice Fox
A1 Rainbow footprint
B1 Moon Shadow on Hill

FIG.5

AA Time
BB Datang Government
CC Player name
DD Stranger
EE Information
FF Player team name
GG Friend
HH Space
II Giving
JJ Transaction
KK Team-up
LL Attack
MM Chat
OO Temporary
PP Team
QQ Image
RR Achievement
XX Cancel viewing
SS Equipment
TT Purchase
UU Task tracking
VV Sign in the event calendar
WW Current

METHOD FOR PROCESSING DRESS-UP PROP, AND NON-TRANSITORY COMPUTER-READABLE STORAGE MEDIUM AND ELECTRONIC DEVICE

CROSS REFERENCE

The present application is a National Stage application of PCT International Application No. PCT/CN2021/072228, filed on Jan. 15, 2021, which is based upon and claims priority to Chinese Patent Application No. 202011341598.2, entitled "Method and apparatus for processing dress-up prop, storage medium, and electronic device," filed on Nov. 25, 2020, the entire contents of both of which are incorporated herein by reference for all purposes.

TECHNICAL FIELD

The present disclosure relates to the technical field of information processing, and in particular, to a method and apparatus for processing a dress-up prop, a storage medium, and an electronic device.

BACKGROUND

In related terminal game products if the player wants to view the dress-up prop corresponding to the game character on the game interface, it is necessary to display the dress-up prop through jump display of different interfaces.

It should be noted that the information disclosed in the above background art is used to enhance the understanding of the background of the present disclosure, and therefore may include information that does not constitute prior art known to those of ordinary skill in the art.

SUMMARY

According to a first aspect the present disclosure, a method for processing a dress-up prop is provided, where a graphical user interface is provided by a first terminal device, content displayed in the graphical user interface includes at least one game character, and the method includes: popping up, in response to a first selection operation instruction for the game character, an information display interface on the graphical user interface, the information display interface including a display window, the display window displaying at least one dress-up prop for dressing on the game character, and the information display interface providing a purchase control; and triggering, in response to an operation instruction for the purchase control, a purchase of the at least one dress-up prop.

According to a second aspect of the present disclosure, an electronic device is provided, and the electronic device includes: a processor; and a memory, configured to store an executable instruction by the processor, where the processor is configured to execute the method for processing the dress-up prop in accordance with the first aspect of the present disclosure.

According to a third aspect of the present disclosure, a non-transitory computer-readable storage medium is provided, having stored thereon instruction that, when executed by a processor of an electronic device, cause the electronic device to perform operations of the methods as disclosed in the first aspect of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 shows a schematic diagram of a game prop according to an embodiment of the present disclosure;

DETAILED DESCRIPTION

Figure 1:
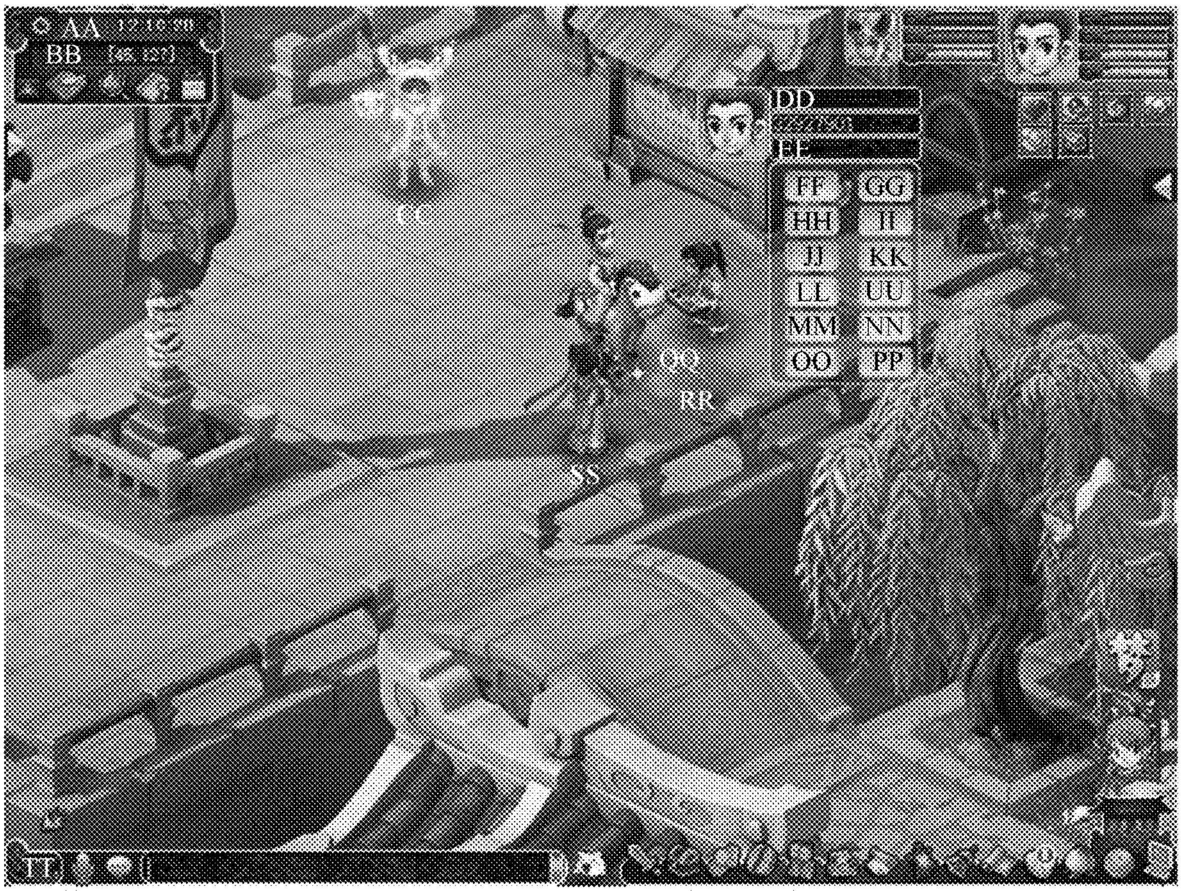
FIG. 1 illustrates a schematic diagram of a game interface in a terminal game.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

In order to make a person skilled in the art better understand the embodiments of the present disclosure, in the embodiments of the present disclosure will be clearly and completely described below with reference to the accompanying drawings of the present disclosure. The described embodiments are only part of the embodiments of the present disclosure, not all of them. All other embodiments obtained by a person of ordinary skill in the art based on the embodiments of the present disclosure without creative efforts shall fall within the protection scope of the present disclosure.

It should be noted that the terms "first", "second" and the like in the description and claims of the present disclosure and the accompanying drawings are used to distinguish similar objects, and do not need to be used to describe a specific sequence or order. It should be understood that the data used in this way may be interchanged under appropriate circumstances so that the embodiments of the disclosure can be described here. Furthermore, the terms "include" and "have" and any variations are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The method for processing a dress-up prop in an embodiment of the present disclosure may run on a terminal device or a server. The terminal device may be a local terminal device. When the method for processing the dress-up prop runs on the server, the method may be implemented and executed based on the cloud interaction system, where the cloud interaction system includes a server and a client device.

In some embodiments, various cloud applications may be run in the cloud interaction system, for example, a cloud game. Taking a cloud game as an example, a cloud game refers to a game mode based on cloud computing. In the running mode of the cloud game, the running body of the game program and the game screen presentation body are separated, the storage and running of the method for processing the dress-up prop are completed on the cloud game server, and the function of the client device is to receive and send data and display game images. For example, the client device can be a display device with a data transmission function close to the user side, such as a mobile terminal, a television, a computer, a palm computer and the like. However, the terminal device performing information processing is a cloud game server on the cloud. When a game is performed, the player operates the client device to send an operation instruction to the cloud game server, the cloud game server runs the game according to the operation instruction, encodes and compresses the data such as the game image, returns the game image to the client device through the network, and finally decodes and outputs the game image through the client device.

In some embodiments, the terminal device may be a local terminal device. Taking a game as an example, the local terminal device stores with a game program and is used for presenting a game image. The local terminal device is configured to interact with the player through a graphical user interface, that is, conventionally to download and install the game program through an electronic device and to run. The manner in which the local terminal device provides the graphical user interface to the player may include a variety of manners, for example, it may be rendered on a display screen of the terminal, or provided to the player by holographic projection. For example, the local terminal device may include a display screen and a processor, the display screen is configured to present a graphical user interface, the graphical user interface includes a game screen, and the processor is configured to run the game, generate the graphical user interface, and control the display of the graphical user interface on the display screen.

In some embodiments, the embodiments of the present disclosure provide a method for processing a dress-up prop, where a graphical user interface is provided by means of a first terminal device, the first terminal device may be the aforementioned local terminal device, or may be a client device in the aforementioned cloud interaction system. The content displayed in the graphical user interface includes at least one game character, the game character is a game character controlled by the first terminal device in a game, or another game character other than the game character controlled by the first terminal device, and the another game character is configured to be controlled by a corresponding terminal device in a game, for example, an enemy or a teammate; it may also be an NPC game character (i.e., a non-player character), where the NPC game character refers to a game character that is not manipulated by a real person in a game, and sometimes also serves as a non-person character, or a non-playable character.

FIG. 1 is a schematic diagram of a game interface in a terminal game of Fantasy Westward Journey 2, where the game interface includes control operation buttons corresponding to a game character, for example, observation, a team-up, transaction, friend, or the like, and a player may jump to a different control interface by clicking the above control operation buttons.

Figure 2:
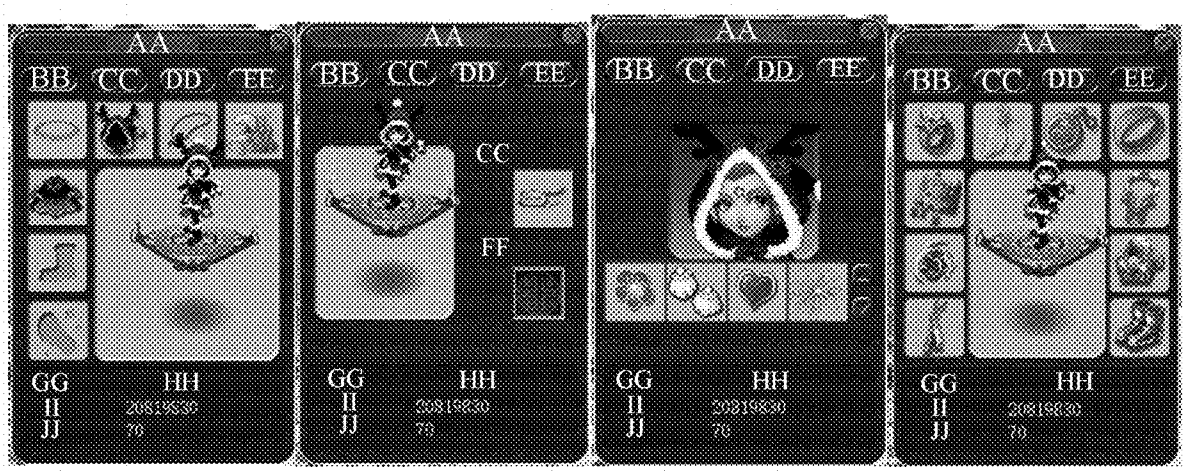
FIG. 2 shows a schematic diagram of a dress-up prop interface in the terminal game.

As shown in FIG. 2, when the player clicks the "Observation" button, the game interface shown jumps to the dress-up prop interface in the terminal game. Different categories of data are stored in multiple layers, and players need to switch between multiple layers of operation interfaces to get access to desired data from different categories. Although the control operation button on the dress-up prop interface shown in FIG. 2 can be clicked to display different dress-up props of the shown game character, for the player, the jump interface operations caused by the plurality of operation control buttons are more and frequent, so that it is difficult to quickly find the dress-up prop to be viewed. At the same time, when the player pre-purchases the dress-up prop, the player needs to exit the dress-up prop interface and switch to the shopping mall interface for searching to purchase the dress-up prop. Obviously, frequent switching skipping of the plurality of operation interfaces causes tedious operation of the player and bad game experience.

Figure 3:
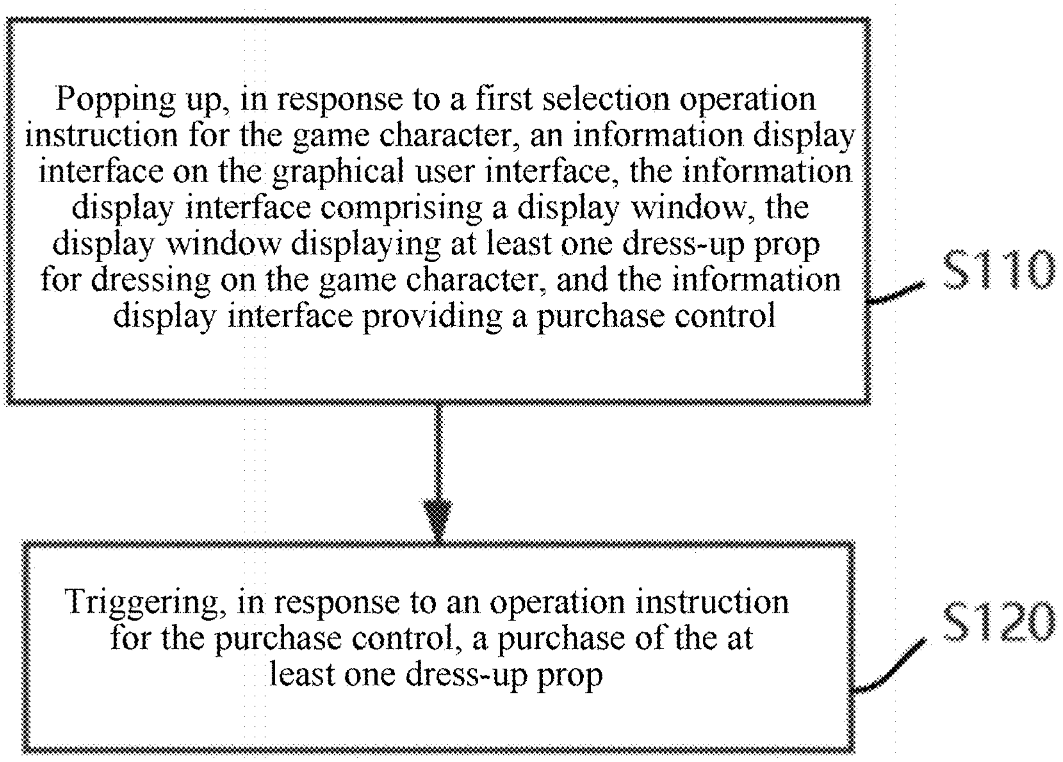
FIG. 3 shows a flowchart of a method for processing a dress-up prop according to an exemplary embodiment of the present disclosure.

The present disclosure provides a method for processing a dress-up prop. FIG. 3 is a flowchart of a method for processing a dress-up prop according to an embodiment of the present disclosure. As shown in FIG. 3, in this embodiment, the method includes the following steps:

In step S110, in response to a first selection operation instruction for the game character, an information display interface is popped up on the graphical user interface, the information display interface includes a display window, and the display window displays at least one dress-up prop for dressing on the game character; meanwhile, a purchase control is provided in the information display interface;

In step S120: in response to an operation instruction for the purchase control, a purchase of at least one dress-up prop is triggered.

According to the method for processing the dress-up prop in the embodiment, the tedious operation and bad game experience caused by frequent jump of the interface when the player views and purchases the dress-up props for the game character may be improved, as the player can purchase the preferred dress-up props for the game character in a one-key manner. The operation is simple, and the user experience is improved.

Then, the steps of the method for processing the dress-up prop in the embodiments of the present disclosure are further described.

In step S110, in response to a first selection operation instruction for the game character, an information display interface is popped up on the graphical user interface, the information display interface includes a display window, and the display window displays at least one dress-up prop for dressing on the game character; meanwhile, a purchase control is provided in the information display interface.

In some embodiments, the selection operation instruction may be preset, or may be set in real time according to the operation instruction of the user during the running of the program. The selection operation may be triggered by detecting the touch operation of a specific trigger control provided in the user graphical interface, or may be triggered according to a preset interaction condition, for example user's pressing, double clicking, shaking, voice input, etc.; it may also be input and controlled by an external input device, such as a keyboard, a mouse, a light pen, a hand-writing input board, a game rod, etc. The external input device is in communication connection with the first terminal device, and the user can input a control instruction to the first terminal device by means of the external input device, to trigger a first selection operation instruction for the game character, so as to pop up an information display interface on the graphical user interface; where a wired or wireless transmission mode used by the external input device and the first terminal device belongs to the prior art, which is not further limited here.

Figure 4:
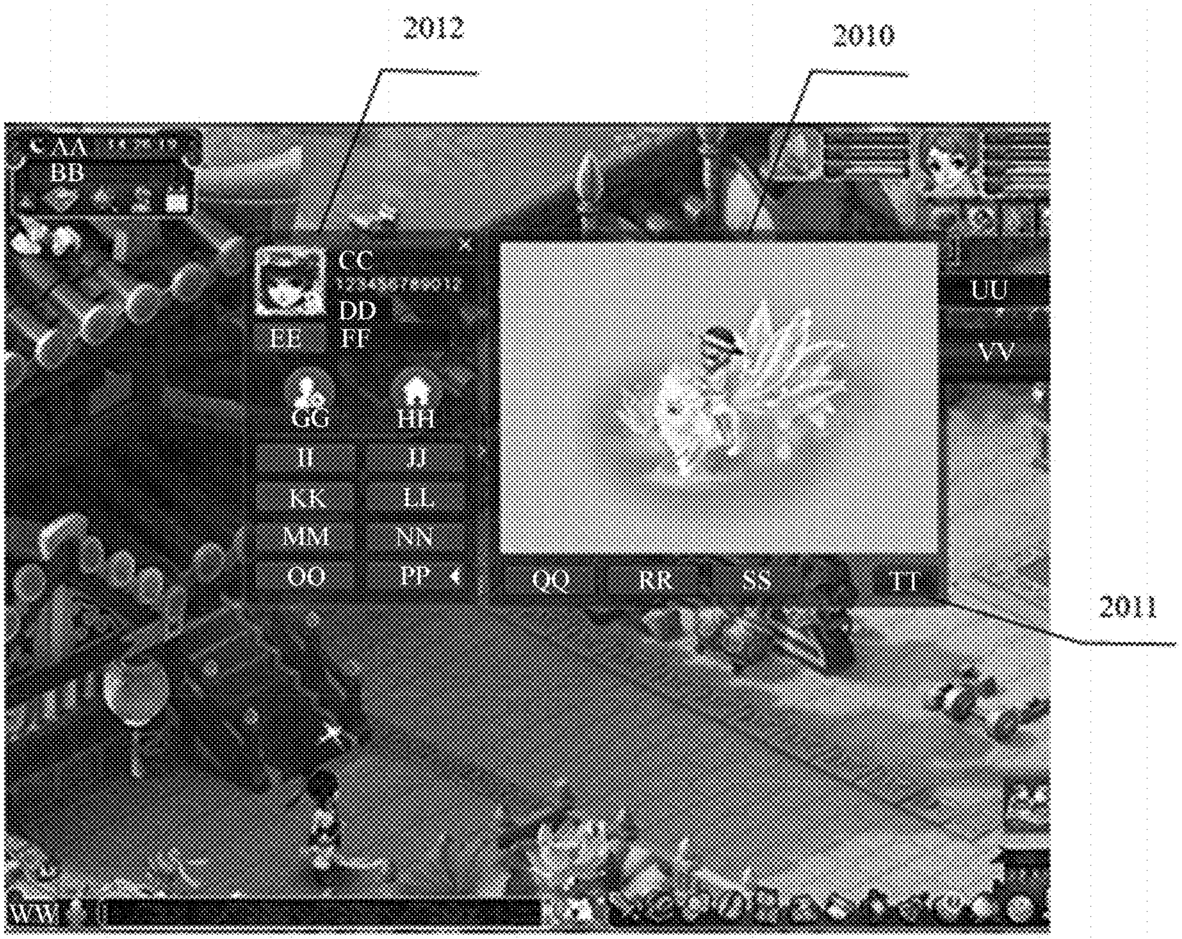
FIG. 4 shows a schematic diagram of an information display interface according to an embodiment of the present disclosure.

In some embodiments, with FIG. 4 as an example, FIG. 4 is a schematic diagram of an information display interface in an embodiment of the present disclosure, and the information display interface includes a display window 2010, a purchase control 2011, related information 2012 of a game player, and the like. The information display interface may be a relatively large area range on the graphical user interface, or may be a relatively small area range on the graphical user interface. The information display interface may be square, rectangular, frame, or other shapes (e.g., circular, etc.). The content presented by the graphical user interface may include all of the information display interface, or may be a part of the information display interface. For example, when the information display interface is enlarged and displayed in the graphical user interface, local content of the information display interface is displayed on the graphical user interface of the terminal device. The information display interface may be displayed on the upper left, the upper right, or other positions in the graphical user interface, and this embodiment is not limited.

In some embodiments, the display window may be a relatively large area range on the information display interface, or may be a relatively small area range on the information display interface. The display window may be square, rectangular, frame, or other shapes (e.g., circular, etc.). The content presented by the information display interface may be a local of the display window. For example, when the display window is enlarged and displayed in the information display interface, local content of the display window is displayed on an information display interface of the terminal device. The display window may be displayed on the upper left, the upper right, or other positions in the information display interface, and this embodiment is not limited.

In some embodiments, the dress-up prop is classified according to the parts equipped on the game character, and may be divided into head equipment, trunk equipment, weapon equipment or pet equipment. For example, the head equipment may be a helmet or hat or the like; the trunk equipment may be a brocade clothing, a colorful decoration, a soft armor or an armband, etc.; the weapon equipment may be a bow arrow, a firearm or a knife, etc.; the pet equipment is a dress-up prop for dressing on the pet, and includes a dress-up prop worn on the pet body, such as a blue and white porcelain dressing up on a nine-tail ice fox, and also includes a dress-up effect attached to the pet, for example, a rainbow footprint or a moon shadow on green hill on the nine-tail ice fox.

In some embodiments, the dress-up prop is classified according to its function, and may be divided into protective equipment, attack equipment and auxiliary equipment. For example, the protective equipment may be a soft nail or a helmet, etc.; the attack equipment may be a bow arrow, a firearm or a knife, etc.; and the auxiliary equipment may have the functions of blood adding, acceleration, dizziness and the like.

In some embodiments, the display window displays a character image of at least one game character, the character image includes at least one dress-up prop dressing up on the game character, and the at least one dress-up prop dressing up on the game character may be a dress-up prop worn on the game character or a dress-up effect attached to the game character; may also be a dress-up prop worn on the pet of the game character, such as a blue and white porcelain dressing up on a nine-tail ice fox; and it also includes a dress-up effect attached to the pet, for example, a rainbow footprint or a moon shadow on green hill on the nine-tail ice fox.

In some embodiments, the character image may be a relatively large area range on the display window, or may be a relatively small area range on the display window. The content presented by the display window may be a local of the character image. For example, when the character image is enlarged and displayed in the display window, local content of the character image is displayed on the display window. The character image may be displayed on the upper left, the upper right, or other positions in the display window, which is not limited in this embodiment.

In some embodiments, a purchase control is provided in the information display interface. The purchase control is configured to perform a function corresponding to the purchase control according to the received touch operation. The purchase control may be displayed on the upper left, the upper right, or other positions in the graphical user interface, which is not limited in this embodiment.

In some embodiments, a game character is displayed on the graphical user interface. An information display interface is popped up on the graphical user interface when a click/long press/repress operation acting on the game character is detected, and the information display interface is suspended above the game scene image in a translucent or opaque form for display. The information display interface includes a display window in which at least one dress-up prop for dressing on the game character is displayed; the information display interface further includes a purchase control configured for direct purchase of at least one dress-up prop displayed in the display window.

In step S120, in response to an operation instruction for the purchase control, a purchase of the at least one dress-up prop is triggered.

In some embodiments, the operation instruction may be preset, or may be set according to the real-time operation of the user during the program running. The operation instruction may be triggered by detecting a touch operation for a specific trigger control provided in the user graphical interface, or may be triggered according to a preset interaction condition, and the operation instruction is similar to the foregoing selection operation instruction, which is not further limited here.

In some embodiments, when a selection operation acting on the purchase control is detected, a one-key purchase of at least one dress-up prop displayed in the display window is triggered.

According to the embodiment, the tedious operation and bad game experience caused by frequent jumping of the interface when the player purchases the dress-up prop for the game character may be improved, as the player can purchase the preferred dress-up prop for the game character in a one-key manner. The operation is simple, and the user experience is improved.

As shown in FIG. 1 and FIG. 2, although some existing game can display different dress-up props for a game character shown on a dress-up prop interface, the game character shown with different dress-up props is usually a game character or an NPC game character controlled by the first terminal device, for example, in the game process, a player can view different dress-up props for the game character controlled by the first terminal device (i.e., controlled by the player) at any time; or, the player can perform information interaction with an NPC game character through the game character controlled by the first terminal device, for example, the player purchases the dress-up prop from the NPC game character. However, in the related art, the display and purchase operations of the dress-up prop for other game characters other than the game character controlled by the first terminal device are not implemented. As per the reason, on one hand, that is because the size of the texture displayed on the dress-up prop of other game characters other than the game character controlled by the first terminal device is limited, it is difficult for the player to visually distinguish the type of the dress-up prop (or not recognized); on the other hand, other game characters other than the game character controlled by the first terminal device are controlled by other players, and there is no similar dress-up prop display window corresponding to the NPC. At the same time, even if the dress-up prop display window corresponding to the NPC is set for the other players, since the dress-up props for the other players have been dressed up, it would not be conceivable to further set the purchase links corresponding to the dress-up props for the other players in the dress-up prop display window. In summary, in the related art, it lacks display and shortcut purchase operations for the dress-up prop for other game characters other than the game character controlled by the first terminal device.

Based on the above-mentioned problem, in some embodiments, the game character is another game character in a game other than a game character controlled by the first terminal device, and another game character is configured to be controlled by a corresponding terminal device in a game. For example, the player A' (or B') controls the game character a (or b) by controlling the terminal device A (or B). When the player A' is playing the game, in response to a first selection operation instruction of the player A' for the game character b controlled by the terminal device B, an information display interface is popped up on a graphical user interface of the terminal device A, the information display interface including a display window, and at least one dress-up prop for dressing on the game character b is displayed on the display window. At the same time, a purchase control is provided in the information display interface, and in response to an operation instruction for the purchase control, a purchase of at least one dress-up prop is triggered, where the dress-up prop is purchased by the player A' for the game character a controlled by himself.

By means of the above embodiments, the player can view the dress-up prop of other players at any time, and implement one-key purchase of the preferred dress-up prop according to the preference of the player, so that the operation is simple, and the user experience is improved.

In some embodiments, the information display interface further includes related information of another game character. For example, the related information of another game character may be the player information corresponding to controlling another game character, or the state information (for example, current blood volume state, attach or defense parameter, etc.) corresponding to another game character, or the dress-up prop information of another game character.

The related information of another game character may be a relatively large area range on the information display interface, or may be a relatively small area range on the information display interface. The related information of another game character may be square, rectangular, frame, or other shapes (such as round, etc.). The content presented by the information display interface may be a local part of the related information of another game character. For example, when the related information of another game character is enlarged and displayed in the information display interface, the local content of the related information of another game character is displayed on the information display interface of the terminal device. The related information of another game character may be displayed on the upper left, the upper right, or other positions in the information display interface, and this embodiment is not limited.

By means of the above embodiments, the related information display interface and the dress-up prop display interface of another game character are effectively integrated, the tedious operation caused by the frequent jump interface is avoided, and the user experience is improved.

In some embodiments, the related information of another game character includes one or more of the following information: a player nickname, an ID number, or a game level, for example, a player nickname of "Xiaoliu", an ID number of "12345678", and a game level of "26".

In some embodiments, the information display interface is suspended above the game scene image in a translucent or opaque form for display. The information display interface includes a display window in which at least one dress-up prop for dressing on the game character is displayed. Optionally, the display window is disposed on the right side of the information display interface. The information display interface further includes a purchase control configured for direct purchase of at least one dress-up prop displayed in the display window. Optionally, the purchase control is placed under the right of the information display interface; and the related information of another game character is placed on the left side of the information display interface, the related information of another game character can be displayed in the form of a list, and the related information of another game character can also be displayed in a sub-graphic arrangement manner, which can be specifically shown in FIG. 4-FIG. 6.

By means of the above embodiments, the related information display interface and the dress-up prop display interface of another game character are effectively integrated, and the related information of another game character can be visually and quickly known, so that the tedious operation caused by the frequent jump interface is avoided, and the user experience is improved.

In step S110, the method further includes:

The dress-up prop includes one or more of the following information: head equipment, trunk equipment, weapon equipment or pet equipment. The dress-up prop specifically refers to the foregoing description, which is not further limited here. By classifying and setting the dress-up prop, it is convenient for the player to know and distinguish the dress-up prop for dressing on the game character, so as to purchase the preferred dress-up prop.

In some embodiments, a wearing part on the game character for at least one dress-up prop to dress is determined, and the dress-up prop is displayed at the wearing part. The wearing part may be a specific part on the game character, for example, a hat worn on the game character head; it may also be a spatial area within a preset range from a specific part on the game character, for example, a flying sword suspended on the top of the head; and it may also be a specific part on the pet of the game character, for example, a brocade clothing "blue and white porcelain" worn on the pet "nine-tail ice fox"; or a spatial area within a preset range from a specific part on the pet of the game character, for example, the dressing effect "rainbow footprint" attached to the foot of the pet "nine-tail ice fox".

In some embodiments, the dress-up prop is displayed at the wearing part, and an identifier, such as a wireframe identifier, a color identifier, or a text identifier, can be set at the wearing part. The dress-up prop may be displayed in a preset space range of the wearing part, or information such as the name, performance or price of the dress-up prop may also be displayed.

By means of the above embodiments, the player may accurately identify the dress-up prop for dressing on the game character, and correspondingly learn about the related information of the dress-up prop, so as to facilitate the player to understand and distinguish the dress-up prop of the game character, thus purchasing the preferred dress-up prop.

Before the triggering of a purchase of at least one dress-up prop in step S120, the method further includes:

In step S1211: at least one dress-up prop for dressing on the game character is determined, transaction information corresponding to the dress-up prop is obtained, and a purchase order of at least one dress-up prop is generated according to the transaction information; In step S1212: triggering of a purchase of at least one dress-up prop includes: triggering purchase of the corresponding equipment prop based on the purchase order.

In step S1211, the method further includes:

the moment when determining the at least one dress-up prop for dressing on the game character can be any moment before the purchase of at least one dress-up prop is triggered, for example, it may be the moment of responding to a first selection operation instruction for the game character.

In some embodiments, the execution moment of step S1211 is any moment before the purchase of at least one dress-up prop is triggered, and it may be executed synchronously with the execution step in step S110. For example, in response to a first selection operation instruction for the game character, step S1211 is executed. Or, in response to an operation instruction for the purchase control, step S1211 is executed. It may be independently executed, for example, when the game character is dressed up with at least one dress-up prop, step S1211 is executed synchronously.

In some embodiments, the transaction information corresponding to the dress-up prop may be any information related to the dress-up prop, for example, the type, price, transaction frequency, player evaluation, historical transaction record of the dress-up prop.

In some embodiments, the purchase order includes one or more of the following information: the type, quantity, unit price, total price or buyer personal information, seller personal information of the dress-up prop.

In some embodiments mode, at least one dress-up prop for dressing on the game character is determined, transaction information corresponding to the dress-up prop is obtained, a purchase order of at least one dress-up prop is generated according to the transaction information. For example, at least one dress-up prop of a helmet for dressing on the game character S is determined, and transaction information corresponding to the helmet (for example, the price of a helmet is 3 game coins) is obtained, and a purchase order of the at least one helmet is generated according to the transaction information: 1 piece of the helmet*3 game coins/piece=3 game coins. The triggering of a purchase of at least one dress-up prop includes triggering a purchase of the corresponding dress-up prop based on the purchase order. For example, when the player triggers the purchase of the helmet, clicking the purchase order is needed to execute the purchase instruction of the helmet.

In some embodiments, after the purchase order of the at least one helmet is generated according to the transaction information, the player may select, modify or delete the number of orders and the purchase type as required. For example, the order "1 piece of helmet*3 game coins/piece=3 game coins" may be amended to: 2 piece of helmets*3 game coins/piece=6 game coins.

By means of the above embodiments, the player can quickly purchase the preferred dress-up prop in a one-key manner, which is easy to operate and does not need to frequently switch the interface, thus improving the user experience.

In step S1211, the method further includes:

determining an identifier corresponding to at least one dress-up prop for dressing on the game character; and obtaining the transaction information corresponding to the identifier by searching in a game mall according to the identifier.

In some embodiments, the identifier corresponding to the dress-up prop may be identified by using numbers, letters, and/or characters. For example, the identifier corresponding to the dress-up prop A is 01, the identifier corresponding to the dress-up prop B is 02. The corresponding relationship between the dress-up prop and the identifier may be in a one-to-one correspondence relationship, that is, each dress-up prop corresponds to a unique identifier. The corresponding relationship between the dress-up prop and the identifier may be in a several-to-one correspondence relationship, that is, similar dress-up props may correspond to an identifier. For example, the pistol corresponds to the identifier 01, and the submachine gun also corresponds to the identifier 01. The corresponding relationship between the dress-up prop and the identifier may be in a one-to-several correspondence relationship. That is, similar dress-up props may correspond to an identifier. For example, the pistol corresponds to the identifier 01, and the submachine gun also corresponds to the identifier 01, which is not further limited herein.

In some embodiments, transaction information corresponding to the identifier is obtained by performing a search in a game mall according to the identifier. For example, there is a dress-up prop A dressing up on the game character S0, an identifier corresponding to the dress-up prop A is 01. According to the identifier, transaction information related to the dress-up prop A identified as 01 is searched in a database where the game mall is located. For example, the player has purchased one piece of dress-up prop with the identifier 01, with the total price of 5 game coins, at 15:39:16 on Apr. 15, 2018.

By means of the above embodiment, the player can determine whether to purchase the preferred dress-up prop by obtaining the transaction information of the dress-up prop, the operation is simple, and the interface is not required to be frequently switched, thus improving the user experience.

In some embodiments, the transaction information includes one or more of the following information: a name, a price, a model, or a function, such as, a submachine gun (name), 10 game coins/branch (unit price), MP 40 (model), high precision (function).

By means of the above embodiment, the player can determine whether to purchase the preferred dress-up prop by obtaining the transaction information of the dress-up prop, the operation is simple, and the interface is not required to be frequently switched, thus improving the user experience.

In some embodiments, with FIG. 5 as an example, FIG. 5 is a schematic diagram of a dress-up prop according to an embodiment of the present disclosure. A cursor 2013 is further displayed on the graphical user interface, and the cursor receives an operation instruction through the first terminal device for control, and the method further includes:

In step 330, a current position of the cursor on the graphical user interface is obtained;

In step 331, in response to the current position being located at a preset position corresponding to the dress-up prop and exceeding a preset duration, a corresponding target dress-up prop according to the current position is determined;

In step 332, the transaction information of the target dress-up prop is displayed on the graphical user interface.

In some embodiments, the cursor may be controlled and input through an external input device, for example, an external input device such as a keyboard, a mouse, a light pen, a handwriting input board, a game rod, and the like. The external input device is in communication connection with the first terminal device, and the player can input a control instruction to the first terminal device through the external input device to trigger an operation instruction for the cursor. Optionally, operations of the cursor such as sliding and staying on the graphical user interface may be controlled by the external input device.

In step 330, it is further included that: the current position may be a current position coordinate of the cursor determined by a coordinate system where the graphical user interface is located; optionally, a current position of the cursor on the graphical user interface is obtained in real time.

In some embodiments, in response to the current position being located at a preset position corresponding to the dress-up prop and exceeding a preset duration, a corresponding target dress-up prop is determined according to the current position. For example, the dress-up prop is with the shortest distance from the current position of the cursor, and staying time of the cursor exceeds a preset duration, optionally, a duration of 2 seconds, and the dress-up prop is the corresponding target dress-up prop. It may also be a nearest dress-up prop in a same horizontal direction or vertical direction (the horizontal direction or the vertical direction being relative to parallel to the horizontal plane of the graphical user interface) with the current position of the cursor, staying time of the cursor exceeds a preset duration, optionally, a duration of 2 seconds, and the dress-up prop is a corresponding target dress-up prop; or, it may be a dress-up prop at upper left or lower right relative to the current position of the cursor, and staying time of the cursor exceeds a preset duration, optionally, a duration of 2 seconds, and the dress-up prop is a corresponding target dress-up prop.

In some embodiments, the transaction information of the target dress-up prop is displayed on the graphical user interface. Optionally, through the operation control instruction of the user, the transaction information can be enlarged or reduced for display. The transaction information may be a relatively large area range on the graphical user interface, or may be a relatively small area range on the graphical user interface. The content presented by the graphical user interface may include all of the transaction information, or may be a local portion of the transaction information. For example, when the transaction information is enlarged and displayed in the graphical user interface, local content of the transaction information is displayed on a graphical user interface of the terminal device. The transaction information may be displayed on the upper left, the upper right, or other positions in the graphical user interface, and this embodiment is not limited.

In this embodiment, the player can randomly view the transaction information of the selected dress-up prop to determine whether it is favorable and whether to purchase the dress-up prop, the operation is simple, and the user experience is improved.

In some embodiments, in response to an operation instruction for the purchase control, triggering a purchase of at least one dress-up prop, further includes: in response to an operation instruction for the purchase control, adding the target dress-up prop to a shopping cart; and in response to the payment instruction, triggering a purchase of the dress-up prop. For example, all the dress-up props for dressing on the game character A are rainbow footprint, moon shadow on green hill and blue and white porcelain. The player selects a dress-up prop of rainbow footprint, that is, the rainbow footprint is the target dress-up prop, and in response to an operation instruction for the purchase control, the rainbow footprint is added to the shopping cart; and in response to the payment instruction, the dress-up prop is triggered to be purchased. Among them, the setting of the payment instruction and the payment page belongs to the related art, which is not further limited here.

By means of the above embodiments, the player can purchase the selected dress-up prop in a one-key manner, so that the operation is simple, and the user experience is improved.

In step S120, it is further included that:

In response to an operation instruction for the purchase control, the dress-up prop is added to a shopping cart; and in response to a payment instruction, a purchase of the dress-up prop is triggered. For example, all the dress-up props for dressing on the game character A are rainbow footprint, moon shadow on green hill and blue and white porcelain, and in response to an operation instruction for the purchase control, the rainbow footprint, the moon shadow on green hill and the blue and white porcelain are packaged and added into the shopping cart in a one-key manner; and in response to the payment instruction, a purchase of the dress-up prop is triggered. Among them, the setting of the payment instruction and the payment page belongs to the related art, which is not further limited here.

By means of the above embodiments, the player may purchase all dress-up props for dressing on the game character through a one-key purchase, the operation is simple, and the user experience is improved.

In some embodiments, the information display interface includes a first operation control, and the first operation control is configured to perform a function corresponding to the first operation control according to a received touch operation. The first operation control may be displayed on the upper left, the upper right, or other positions in the information display interface, and this embodiment is not limited.

Figure 6:
FIG. 6 shows a schematic diagram of a multi-information integration interface according to an embodiment of the present disclosure.

In some embodiments, with FIG. 6 as an example, FIG. 6 is a schematic diagram of a multi-information integration interface according to an embodiment of the present disclosure. In response to a control instruction for the first operation control, the display window is turned on or turned off. For example, when a player clicks a first operation control-"observation" button, the information display interface does not need to be jumped or switched, in which the display window is turned on. As shown in FIG. 6, by using the interaction operation for the state, content such as a brocade clothing, a mascot, and a colorful decoration for dressing on the game character is displayed in the display window of the information display interface, and if the display window is desired to be closed. Optionally, a "cancel observation" button is clicked to close the display window. Meanwhile, the display window further includes a sub-graph corresponding to another dress-up prop recommended to the player; by selecting the sub-graph corresponding to another dress-up prop, the selected another dress-up prop can be used as a target dress-up prop, and in response to an operation instruction for the purchase control, the target dress-up prop is added into the shopping cart; and in response to the payment instruction, a purchase of the dress-up prop is triggered.

By means of the above embodiments, when the player views or cancels viewing of the dress-up prop for dressing on the game character, the player does not need to switch more than one display interface back and forth, so as to reduce the interruption feeling and facilitate the player to purchase the preferred dress-up prop; meanwhile, by integrating the interface information and optimizing the interaction level, the operation process is simplified, the experience is smoother; and the user experience is better. Among them, the purchase and payment steps are the same as those of the foregoing operation steps, which is not further limited here.

In some embodiments, the information display interface includes a second operation control, and the second operation control is configured to perform a function corresponding to the first operation control according to a received touch operation. The second operation control may be displayed on the upper left, the upper right, or other positions in the information display interface, which is not limited in this embodiment.

In some embodiments, in response to a control instruction for the second operation control, a sub-graph corresponding to a dress-up prop of the game character is displayed on the information display interface; and in response to a third selection operation instruction for the sub-graph, the dress-up prop of the game character is switched and displayed.

In some embodiments, the sub-graph may be a two-dimensional pattern formed by combining one or more feature elements such as color, line, shape, or structure, and the visual effect presented by the two-dimensional pattern matches with the dress-up prop, for example, the appearance of the sub-graph is the same as or similar to the appearance of the corresponding dress-up prop, so that the player can directly know the type or model of the dress-up prop through the sub-graph. Optionally, the sub-graph is displayed directly below, on the upper right, or other positions in the information display interface, and this embodiment is not limited.

By means of the above embodiments, when the player views the dress-up prop for dressing on the game character, the player does not need to switch more than one display interface back and forth, so as to reduce the interruption.

Figure 7:
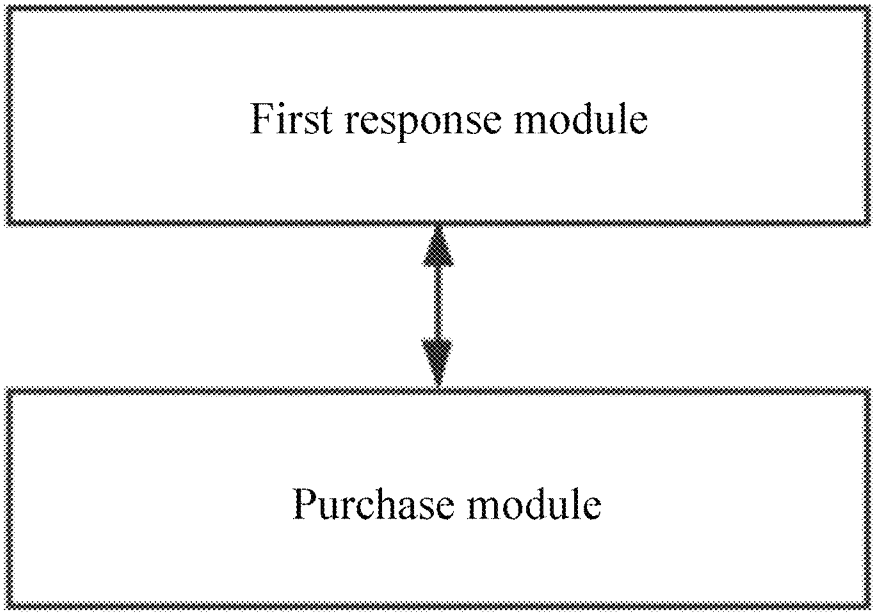
FIG. 7 shows a composition diagram of an apparatus for processing a dress-up prop according to an embodiment of the present disclosure.

The present embodiment further discloses an apparatus for processing a dress-up prop, and FIG. 7 is a composition diagram of an apparatus for processing a dress-up prop according to an embodiment of the present disclosure. As shown in FIG. 7, the apparatus includes:

a graphical user interface, configured to display content comprising at least one game character;

a first response module, configured to pop up an information display interface on the graphical user interface in response to a first selection operation instruction for the game character, the information display interface including a display window, the display window displaying at least one dress-up prop for dressing on the game character, and the information display interface providing a purchase control;

a purchase module, configured to trigger a purchase of at least one dress-up prop in response to an operation instruction for the purchase control.

Optionally, the game character is another game character in a game other than a game character controlled by the first terminal device, and another game character is configured to be controlled by a corresponding terminal device in a game.

Optionally, before triggering the purchase of the at least one dress-up prop, it is further included that: determining at least one dress-up prop for dressing on the game character, obtaining transaction information corresponding to the dress-up prop, and generating a purchase order of at least one dress-up prop according to the transaction information, where the triggering the purchase of the at least one dress-up prop includes: triggering a purchase of a corresponding dress-up prop based on the purchase order.

Optionally, the determining at least one dress-up prop for dressing on the game character and obtaining the transaction information corresponding to the dress-up prop, further includes: determining an identifier corresponding to the at least one dress-up prop for dressing on the game character; and obtaining the transaction information corresponding to the identifier by searching in a game mall according to the identifier.

Optionally, the transaction information includes one or more of the following information: a name, a price, a model, or a function.

Optionally, a cursor is further displayed on the graphical user interface, the cursor is controlled by the first terminal device to receive an operation instruction, and the method further includes: obtaining a current position of the cursor on the graphical user interface; in response to the current position being located at a preset position corresponding to the dress-up prop and exceeding a preset duration, determining a corresponding target dress-up prop according to the current position; and displaying the transaction information of the target dress-up prop on the graphical user interface. Optionally, in response to the operation instruction for the purchase control, triggering the purchase of the at least one dress-up prop, further includes: in response to an operation instruction for the purchase control, adding the target dress-up prop to a shopping cart; and in response to a payment instruction, triggering the purchase of the dress-up prop.

Optionally, in response to the operation instruction for the purchase control, triggering the purchase of the at least one dress-up prop, further includes: in response to an operation instruction for the purchase control, adding the dress-up prop to a shopping cart; and in response to a payment instruction, triggering the purchase of the dress-up prop.

Optionally, the information display interface further includes related information of another game character.

Optionally, the related information of another game character includes one or more of the following information: a player nickname, an ID number, or a game level.

Optionally, the dress-up prop includes one or more of the following information: a head equipment, a trunk equipment, a weapon equipment or a pet equipment.

Optionally, the display window displaying at least one dress-up prop for dressing on the game character further includes: determining a wearing part of the at least one dress-up prop for dressing on the game character;

And displaying the dress-up prop at the wearing part.

Optionally, the information display interface includes a first operation control, and the method further includes:

in response to a control instruction for the first operation control, turning on or turning off the display window.

Optionally, the information display interface includes a second operation control, and the method further includes:

in response to a control instruction for the second operation control, displaying a sub-graph corresponding to a dress-up prop of the game character on the information display interface; and in response to a third selection operation instruction for the sub-graph, switching to display a dress-up prop of the game character.

By means of the above embodiments, the tedious operation and bad game experience caused by frequent jumping of the interface when the player views and purchases the dress-up prop of the game character may be improved, as the player can purchase the preferred dress-up prop for the game character in a one-key manner. The operation is simple, and the user experience is improved.

The specific details of each module unit in the above embodiment have been described in detail in the corresponding method for processing the dress-up prop, and in addition, the apparatus for processing the dress-up prop further includes other unit modules corresponding to the method for processing the dress-up prop, which will not be repeated here.

It should be noted that although several modules or units of a device for action execution are mentioned in the above detailed description, such division is not mandatory. In fact, according to embodiments of the present disclosure, the features and functions of two or more modules or units described above may be embodied in one module or unit. Conversely, the features and functions of one module or unit described above may be further divided into a plurality of modules or units for materialization.

Figure 8:
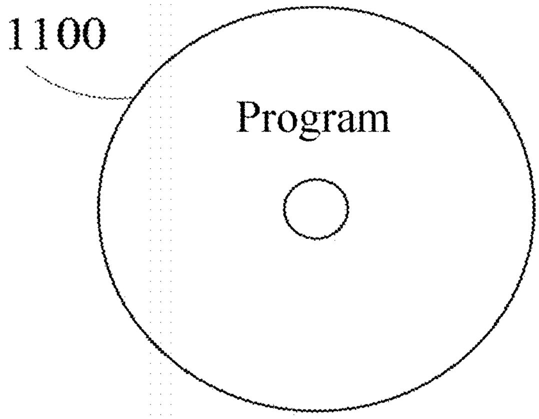
FIG. 8 shows a schematic structural diagram of a computer-readable storage medium according to an embodiment of the present disclosure.

FIG. 8 is a schematic structural diagram of a computer-readable storage medium according to an embodiment of the present disclosure. As shown in FIG. 8, a program product 1100 according to an embodiment of the present disclosure is described, a computer program is stored on it, and in some embodiments, when the computer program is executed by the processor, the following steps are implemented:

in response to a first selection operation instruction for the game character, popping up an information display interface on the graphical user interface, where the information display interface includes a display window, and the display window displays at least one dress-up prop for dressing on the game character; meanwhile, providing a purchase control in the information display interface;

in response to an operation instruction for the purchase control, triggering a purchase of the at least one dress-up prop.

Optionally, the game character is another game character in a game other than a game character controlled by the first terminal device, and another game character is configured to be controlled by a corresponding terminal device in a game.

Optionally, before triggering the purchase of the at least one dress-up prop, it is further included that: determining the at least one dress-up prop for dressing on the game character, obtaining transaction information corresponding to the dress-up prop, and generating a purchase order of the at least one dress-up prop according to the transaction information, where the triggering the purchase of at least one dress-up prop includes: triggering a purchase of a corresponding dress-up prop based on the purchase order.

Optionally, the determining the at least one dress-up prop on the game character and obtaining transaction information corresponding to the dress-up prop, further includes: determining an identifier corresponding to the at least one dress-up prop for dressing on the game character; and obtaining the transaction information corresponding to the identifier by searching in a game mall according to the identifier.

Optionally, the transaction information includes one or more of the following information: a name, a price, a model, or a function.

Optionally, a cursor is further displayed on the graphical user interface, the cursor is controlled by the first terminal device to receive an operation instruction, and the method further includes: obtaining a current position of the cursor on the graphical user interface; in response to the current position being located at a preset position corresponding to the dress-up prop and exceeding a preset duration, determining a corresponding target dress-up prop according to the current position; and displaying the transaction information of the target dress-up prop on the graphical user interface. Optionally, in response to the operation instruction for the purchase control, triggering the purchase of the at least one dress-up prop, further includes: in response to an operation instruction for the purchase control, adding the target dress-up prop to a shopping cart; and in response to a payment instruction, triggering the purchase of the dress-up prop.

Optionally, in response to the operation instruction for the purchase control, triggering the purchase of the at least one dress-up prop, further includes: in response to an operation instruction for the purchase control, adding the dress-up prop to a shopping cart; and in response to a payment instruction, triggering the purchase of the dress-up prop.

Optionally, the information display interface further includes related information of another game character.

Optionally, the related information of another game character includes one or more of the following information: a player nickname, an ID number, or a game level.

Optionally, the dress-up prop includes one or more of the following information: a head equipment, a trunk equipment, a weapon equipment or a pet equipment.

Optionally, the display window displaying the at least one dress-up prop for dressing on the game character further includes: determining a wearing part of the at least one dress-up prop for dressing on the game character;

displaying the dress-up prop at the wearing part.

Optionally, the information display interface includes a first operation control, and the method further includes:

in response to a control instruction for the first operation control, turning on or turning off the display window.

Optionally, the information display interface includes a second operation control, and the method further includes:

in response to a control instruction for the second operation control, displaying a sub-graph corresponding to a dress-up prop of the game character on the information display interface; and in response to a third selection operation instruction for the sub-graph, switching to display a dress-up prop of the game character.

The computer-readable storage medium according to the embodiments of the present disclosure stores a computer program, and when the computer program is executed by the processor, the method steps of the method for processing the dress-up prop are implemented. By means of the above the embodiment, the tedious operation and bad game experience caused by frequent jumping of the interface when the player views and purchases the dress-up prop of the game character may be improved, as the player can purchase the preferred dress-up prop of the game character in a one-key manner. The operation is simple, and the user experience is improved.

The computer-readable storage medium may include a data signal propagated in a baseband or as part of a carrier, where readable program code is carried. Such propagated data signals may take a variety of forms, including, but not limited to, electromagnetic signals, optical signals, or any suitable combination of them. A computer-readable storage medium may transmit, propagate, or transmit a program for use by or in connection with an instruction execution system, apparatus, or device.

The program code contained in the computer-readable storage medium may be transmitted by any suitable medium, including but not limited to wireless, wired, optical cable, radio frequency, etc. or any suitable combination of the above.

The electronic device 1000 in the embodiment is described below with reference to FIG. 9. The electronic device 1000 is an example, and should not bring any limitation to the functions and use ranges of the embodiments of the present disclosure.

Figure 9:
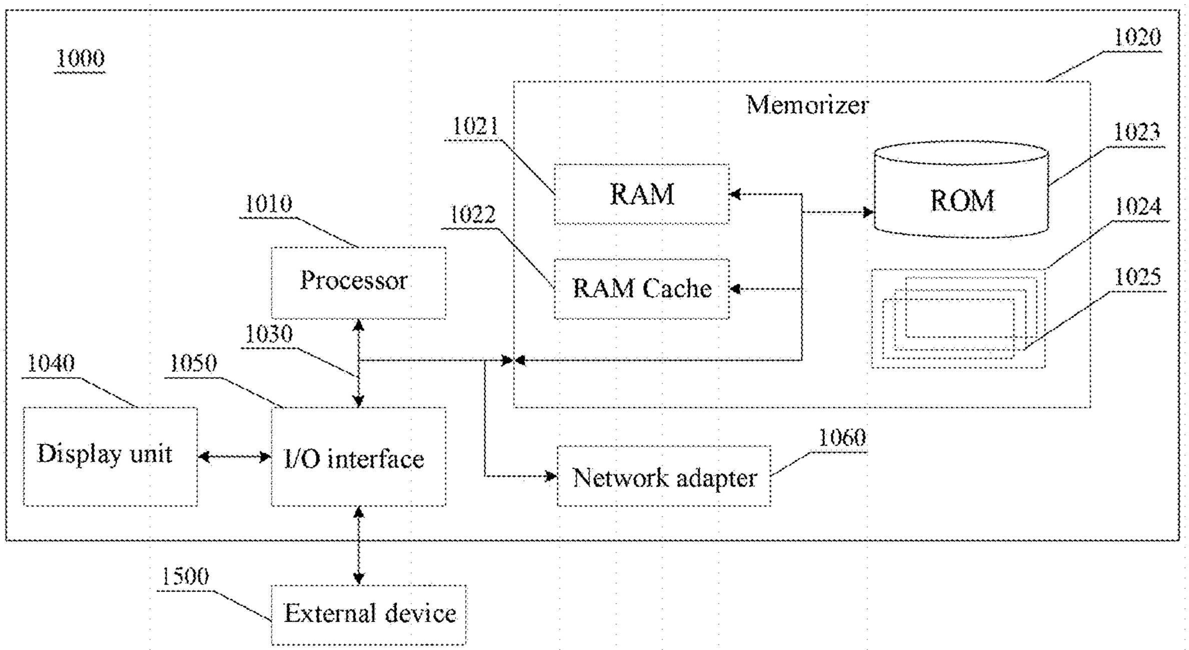
FIG. 9 shows a composition diagram of an electronic device according to an embodiment of the present disclosure.

Referring to FIG. 9, the electronic device 1000 is shown in the form of a general-purpose computing device. The components of the electronic device 1000 may include, but are not limited to, at least one processor 1010, at least one memory 1020, a bus 1030 connecting different system components (including the processor 1010 and the memory 1020), and a display unit 1040.

Among them, the memory 1020 stores a program code, and the program code may be executed by the processor 1010, so that the processor 1010 implements the following steps by executing the executable instruction:

in response to a first selection operation instruction for the game character, popping up an information display interface on the graphical user interface, where the information display interface includes a display window, and the display window displays at least one dress-up prop dress up on the game character; meanwhile, providing a purchase control in the information display interface;

in response to an operation instruction for the purchase control, triggering a purchase of the at least one dress-up prop.

Optionally, the game character is another game character in a game other than a game character controlled by the first terminal device, and another game character is configured to be controlled by a corresponding terminal device in a game.

Optionally, before triggering the purchase of the at least one dress-up prop, it is further included that: determining the at least one dress-up prop for dressing on the game character, obtaining transaction information corresponding to the dress-up prop, and generating a purchase order of the at least one dress-up prop according to the transaction information, where the triggering the purchase of at least one dress-up prop includes: triggering a purchase of a corresponding dress-up prop based on the purchase order.

Optionally, the determining the at least one dress-up prop on the game character and obtaining transaction information corresponding to the dress-up prop, further includes: determining an identifier corresponding to the at least one dress-up prop for dressing on the game character; and obtaining the transaction information corresponding to the identifier by searching in a game mall according to the identifier.

Optionally, the transaction information includes one or more of the following information: a name, a price, a model, or a function.

Optionally, a cursor is further displayed on the graphical user interface, the cursor is controlled by the first terminal device to receive an operation instruction, and the method further includes: obtaining a current position of the cursor on the graphical user interface; in response to the current position being located at a preset position corresponding to the dress-up prop and exceeding a preset duration, determining a corresponding target dress-up prop according to the current position; and displaying the transaction information of the target dress-up prop on the graphical user interface. Optionally, in response to the operation instruction for the purchase control, triggering the purchase of the at least one dress-up prop, further includes: in response to an operation instruction for the purchase control, adding the target dress-up prop to a shopping cart; and in response to a payment instruction, triggering the purchase of the dress-up prop.

Optionally, in response to the operation instruction for the purchase control, triggering the purchase of the at least one dress-up prop, further includes: in response to an operation instruction for the purchase control, adding the dress-up prop to a shopping cart; and in response to a payment instruction, triggering the purchase of the dress-up prop.

Optionally, the information display interface further includes related information of another game character.

Optionally, the related information of another game character includes one or more of the following information: a player nickname, an ID number, or a game level.

Optionally, the dress-up prop includes one or more of the following information: a head equipment, a trunk equipment, a weapon equipment or a pet equipment.

Optionally, the display window displaying the at least one dress-up prop for dressing on the game character further includes: determining a wearing part of the at least one dress-up prop for dressing on the game character;

displaying the dress-up prop at the wearing part.

Optionally, the information display interface includes a first operation control, and the method further includes:

in response to a control instruction for the first operation control, turning on or turning off the display window.

Optionally, the information display interface includes a second operation control, and the method further includes:

in response to a control instruction for the second operation control, displaying a sub-graph corresponding to a dress-up prop of the game character on the information display interface; and in response to a third selection operation instruction for the sub-graph, switching to display a dress-up prop of the game character.

According to an embodiment of the present disclosure, the electronic device includes: a processor; and a memory, configured to store an executable instruction by the processor, where the processor is configured to perform specific method steps of the method for processing the dress-up prop by executing the executable instruction. According to the embodiment, the tedious operation and bad game experience caused by frequent jumping of the interface when the player views and purchases the dress-up prop of the game character may be improved, as the player can purchase the dress-up prop of the preferred game character in a one-key manner. The operation is simple, and the user experience is improved.

The memory 1020 may include a readable medium in the form of a volatile memory unit, for example, a random access memory unit (RAM) 1021 and/or a cache memory unit 1022, and may further include a read-only memory unit (ROM) 1023

The memory 1020 may also include a program/utility 1024 having a set of (at least one) program module 1025 including, but not limited to: an operating system, one or more applications, other program modules, and program data, each of these examples or some combination of which may include an implementation of a network environment.

The bus 1030 may be one or more of several types of bus structures, including a memory cell bus or a memory cell controller, a peripheral bus, a graphics acceleration port, a processing unit, or a local bus using any of a variety of bus structures.

The electronic device 1000 may also communicate with one or more external devices 1500 (e.g., a keyboard, a pointing device, a Bluetooth device, etc.), it may also communicate with one or more devices that enable a user to interact with the electronic device 1000, and/or it may communicate with any device (e.g., router, modem, etc.) that enables the electronic device 1000 to communicate with one or more other computing devices. Such communication may be performed by an input/output (I/O) interface 1050. Also, the electronic device 1000 may communicate with one or more networks (e.g., a local area network (LAN), a wide area network (WAN), and/or a public network, such as the Internet) through the network adapter 1060. As shown, network adapter 1060 communicates with other modules of electronic device 1000 through bus 1030. It should be understood that although not shown in the figures, other hardware and/or software modules may be used in conjunction with electronic device 1000, including but not limited to: microcode, device drivers, redundant processing units, external disk drive arrays, RAID systems, tape drives, and data backup storage systems, etc.

The electronic device may also include a power supply component configured to perform power management on the execution electronic device, a wired or wireless network interface configured to connect the electronic device to the network, and an input output (I/O) interface. The electronic device may operate based on operating systems stored in memory, such as Android, IGS, Windows, MAC OS X, UNIX, Linux, FreeBSD, or the like.

Through the description of the above embodiments, a person skilled in the art would easily understand that the example implementations described here may be implemented by software, or may be implemented by software in combination with necessary hardware. Therefore, the technical solution according to the embodiments of the present disclosure may be embodied in the form of a software product, and the software product may be stored in a non-volatile storage medium (which may be a CD-ROM, a USB flash disk, a mobile hard disk, etc.) or on a network, including several instructions to enable a computing device (which may be a personal computer, a server, an electronic device, or a network device, etc.) to perform the method according to the embodiments of the present disclosure.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Other embodiments of the present disclosure will be apparent to those skilled in the art from consideration of the specification and practice of the invention disclosed here. The present disclosure is intended to cover any variations, uses, or adaptations of the present disclosure following the general principles of the present disclosure and including common general knowledge or customary technical means in the art not disclosed in this disclosure. It is intended that the specification and examples be considered as examples, with a true scope and spirit of the disclosure being indicated by the claims.

It should be understood that the present disclosure is not limited to the exact construction that has been described above and illustrated in the accompanying drawings, and that various modifications and changes may be made without departing from the scope thereof. It is intended that the scope of the present disclosure be limited by the appended claims.

What is claimed is:

1. A method for displaying a dress-up prop for a game character in a game application, performed by a first terminal device, and comprising:

displaying, in response to a first selection operation instruction for a game character in a game scene image, an information display interface suspended above the game scene image on a graphical user interface, wherein the graphical user interface is provided by the first terminal device, the first terminal device is configured to interact with a player through the graphical user interface by running a game program, the game scene image displayed in the graphical user interface comprises the game character, the game character comprises at least one of a non-player character or another game character in the game application other than a game character controlled by the first terminal device, the information display interface comprises a display window, the display window displays a dress-up prop for dressing on the game character, and the information display interface comprises a purchase control and a first operation control;

turning on or turning off the display window, in response to a control instruction for the first operation control, without switching the information display interface; and performing, in response to an operation instruction for the purchase control, a function corresponding to the purchase control on the dress-up prop.

2. The method according to claim 1, wherein the another game character is configured to be controlled in the game application by a corresponding terminal device.

3. The method according to claim 2, wherein the information display interface further comprises related information of the another game character.

4. The method of claim 3, wherein the related information of the another game character comprises one or more of following information: a player nickname, an ID number, or a game level.

5. The method according to claim 1, wherein the method further comprises:

determining the dress-up prop for dressing on the game character, obtaining transaction information corresponding to the dress-up prop, and generating a purchase order of the dress-up prop according to the transaction information;

wherein-performing the function corresponding to the purchase control on the dress-up prop comprises: triggering a purchase of a corresponding dress-up prop based on the purchase order.

6. The method according to claim 5, wherein determining the dress-up prop for dressing on the game character and obtaining the transaction information corresponding to the dress-up prop further comprises:

determining an identifier corresponding to the dress-up prop for dressing on the game character; and obtaining the transaction information corresponding to the identifier by searching in a game mall according to the identifier.

7. The method according to claim 5, wherein the transaction information comprises one or more of following information: a name, a price, a model, or a function.

8. The method according to claim 7, wherein a cursor is further displayed on the graphical user interface, the cursor is controlled by the first terminal device to receive an operation instruction, and the method further comprises:

obtaining a current position of the cursor on the graphical user interface;

determining, in response to the current position being located at a preset position corresponding to the dress-up prop and exceeding a preset duration, a corresponding target dress-up prop according to the current position; and displaying the transaction information of the target dress-up prop on the graphical user interface.

9. The method according to claim 8, wherein in response to the operation instruction for the purchase control, performing the function corresponding to the purchase control on-the dress-up prop further comprises:

adding, in response to the operation instruction for the purchase control, the target dress-up prop to a shopping cart; and triggering, in response to a payment instruction, the purchase of the dress-up prop.

10. The method according to claim 1, wherein in response to the operation instruction for the purchase control, performing the function corresponding to the purchase control on the dress-up prop further comprises:

adding, in response to an operation instruction for the purchase control, the dress-up prop to a shopping cart; and triggering, in response to a payment instruction, the purchase of the dress-up prop.

11. The method according to claim 1, wherein the dress-up prop comprises one or more of following props: a head equipment, a trunk equipment, a weapon equipment, or a pet equipment.

12. The method according to claim 11, wherein the display window displaying the dress-up prop for dressing on the game character further comprises:

determining a wearing part of the game character for displaying the dress-up prop; and displaying the dress-up prop at the wearing part of the game character.

13. The method according to claim 1, wherein the information display interface comprises a second operation control, and the method further comprises:

displaying, in response to a control instruction for the second operation control, a sub-graph corresponding to a dress-up prop of the game character on the information display interface; and switching, in response to a third selection operation instruction for the sub-graph, to display the dress-up prop of the game character.

14. An electronic device, comprising:

a processor; and a memory, configured to store an executable instruction by the processor;

wherein the processor is configured, by executing the executable instruction, to:

display, in response to a first selection operation instruction for a game character in a game scene image, an information display interface suspended above the game scene image on a graphical user interface, wherein the graphical user interface is provided by-the electronic device, the electronic device is configured to interact with a player through the graphical user interface by running a game program, the game scene image displayed in the graphical user interface comprises the game character, the game character comprises at least one of a non-player character or another game character in the game application other than a game character controlled by a first terminal device, the information display interface comprises a display window, the display window displays a dress-up prop for dressing on the game character, and the information display interface comprises a purchase control and a first operation control;

turn on or turn off the display window, in response to a control instruction for the first operation control, without switching the information display interface; and perform, in response to an operation instruction for the purchase control, a function corresponding to the purchase control on the dress-up prop.

15. The electronic device according to claim 14, wherein the another game character is configured to be controlled in the game application by a corresponding terminal device.

16. The electronic device according to claim 14, wherein the processor is configured to:

determine the dress-up prop for dressing on the game character, obtain transaction information corresponding to the dress-up prop, and generate a purchase order of the dress-up prop according to the transaction information; and wherein performing the function corresponding to the purchase control on the dress-up prop further comprises: triggering a purchase of a corresponding dress-up prop based on the purchase order.

17. The electronic device according to claim 14, wherein the information display interface comprises a second operation control, and the processor is configured to:

display, in response to a control instruction for the second operation control, a sub-graph corresponding to a dress-up prop of the game character on the information display interface; and switch, in response to a third selection operation instruction for the sub-graph, to display the dress-up prop of the game character.

18. A non-transitory computer-readable storage medium having stored thereon an instruction that, when executed by a processor of an electronic device, causes the electronic device to perform operations of a method for displaying a dress-up prop for a game character in a game application, the method comprising:

displaying, in response to a first selection operation instruction for a game character in a game scene image, an information display interface suspended above the game scene image on a graphical user interface, wherein the graphical user interface is provided by a first terminal device, the first terminal device is configured to interact with a player through the graphical user interface by running a game program, the game scene image displayed in the graphical user interface comprises the game character, the game character comprises at least one of a non-player character or another game character in the game application other than a game character controlled by the first terminal device, the information display interface comprises a display window, the display window displays a dress-up prop for dressing on the game character, and the information display interface comprises a purchase control and a first operation control;

turning on or turning off the display window, in response to a control instruction for the first operation control, without switching the information display interface; and performing, in response to an operation instruction for the purchase control, a function corresponding to the purchase control on the dress-up prop.

* * * * *